United States Patent [19]

Sasaki et al.

[11] Patent Number: 4,811,161
[45] Date of Patent: Mar. 7, 1989

[54] THROUGH-TYPE CAPACITOR AND MAGNETRON USING SAME

[75] Inventors: Setsuo Sasaki; Shoichi Iwaya; Teruo Taguchi; Seizou Tanaka; Takeyoshi Satoh; Mutsuo Koganebuchi, all of Akita, Japan

[73] Assignee: TDK Corporation, Nihonbashi, Japan

[21] Appl. No.: 94,835

[22] Filed: Sep. 10, 1987

[30] Foreign Application Priority Data

Sep. 11, 1986 [JP] Japan .................... 61-139793[U]
Jan. 30, 1987 [JP] Japan .................... 62-11454[U]
Mar. 4, 1987 [JP] Japan .................... 62-31486[U]

[51] Int. Cl.⁴ .............................................. H01G 4/42
[52] U.S. Cl. .................................... 361/302; 361/330
[58] Field of Search ............... 361/302, 330, 331, 380; 29/570.1

[56] References Cited

U.S. PATENT DOCUMENTS

| | | | |
|---|---|---|---|
| 3,035,237 | 5/1962 | Schlicke | 361/302 X |
| 4,170,694 | 10/1979 | Chase et al. | 361/433 S X |
| 4,370,698 | 1/1983 | Sasaki | 361/302 X |
| 4,558,399 | 12/1985 | Toyama et al. | 29/570.1 |

FOREIGN PATENT DOCUMENTS 1002889 2/1957 Fed. Rep. of Germany ...... 361/302

Primary Examiner—Donald A. Griffin
Attorney, Agent, or Firm—Oblon, Fisher, Spivak, McClelland & Maier

[57] ABSTRACT

A through-type capacitor capable of effectively preventing peeling of an insulation resin from a ceramic dielectric and providing an insulation case of the capacitor with heat resistance, tracking resistance, arc resistance to improve burning resistance of the case, resulting in safely and positively operating for a long period of time. The capacitor includes an insulation case arranged to surround a ceramic dielectric and filled with insulation resin materials to embed the ceramic dielectric in the materials. The insulation case includes a first insulation case member formed of thermoplastic resin and arranged to surround the ceramic dielectric and a second insulation case member formed of thermosetting resin and integrally mounted on the first insulation case member.

23 Claims, 12 Drawing Sheets

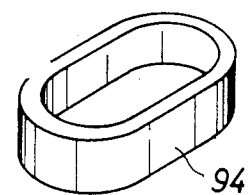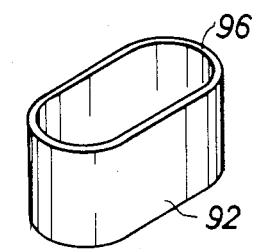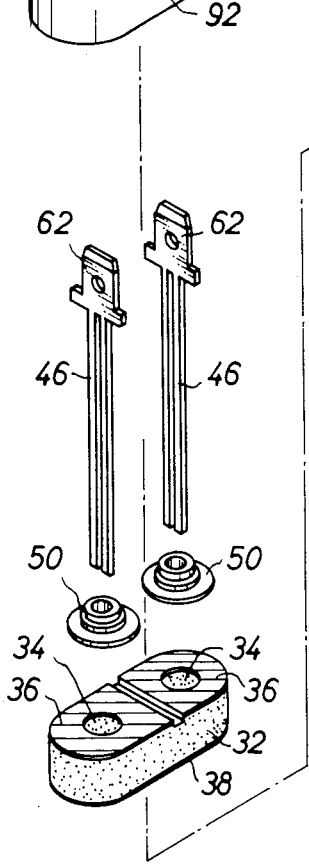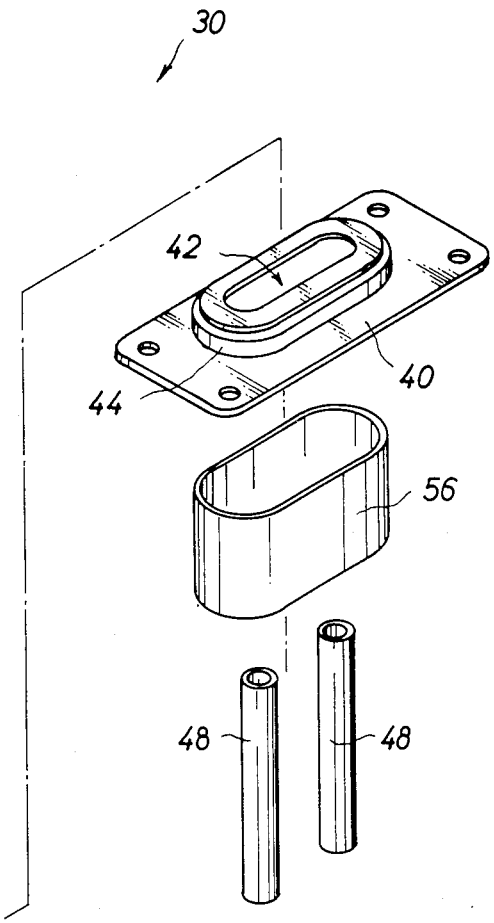
FIG.8

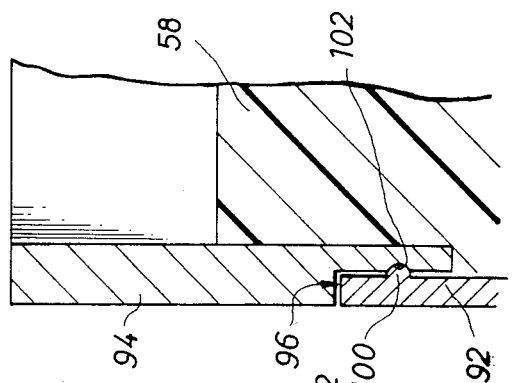
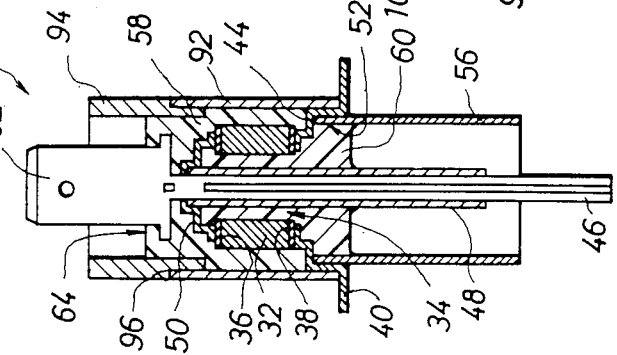
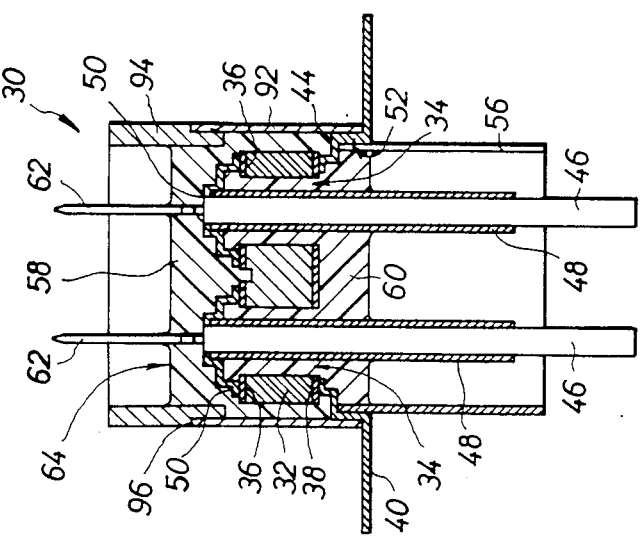

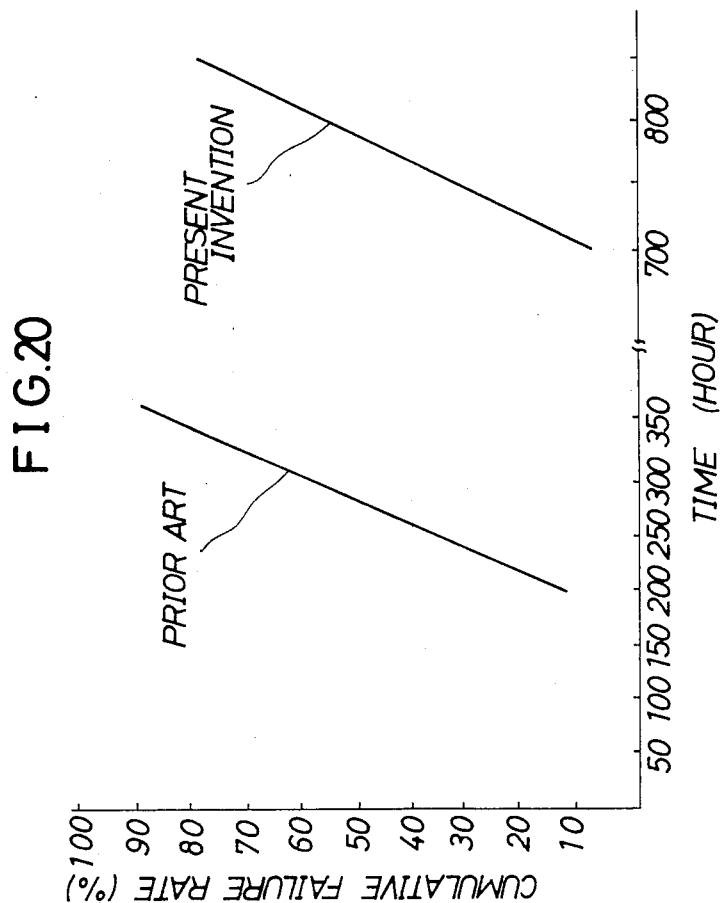

THROUGH-TYPE CAPACITOR AND MAGNETRON USING SAME

BACKGROUND OF THE INVENTION

1. Field of the Invention

This invention relates to a through-type capacitor and a magnetron using the same, and more particularly to a through-type capacitor of high dielectric strength suitable for use for a high-frequency and large-power apparatus such as, for example, an electronic range or cooking stove, a broadcasting magnetron, a noise filter for an X-ray tube or the like and a magnetron in which such a through-type capacitor is incorporated.

2. Description of the Prior Art

A conventional through-type capacitor is typically constructed in such a manner as shown in FIGS. 1 to 3. More particularly, a conventional through-type capacitor which is generally designated by reference numeral 30 in FIGS. 1 to 3 includes a ceramic dielectric 32 formed into an elliptic shape. The ceramic dielectric 32 is formed with a pair of vertical through-holes 34 in a manner to be substantially parallel to each other. Also, the ceramic dielectric 32 is provided on an upper surface with a pair of electrodes 36, which are separated from each other and on a lower surface thereof with a common electrode 38. The separate electrodes 36 and common electrode 38 are formed with through-holes corresponding to the through-holes 34 of the dielectric 32, respectively. The capacitor 30 also includes a ground fitment 40 formed at a central portion thereof with an opening 42 and provided on one surface thereof with an upstand 44 of a suitable height, which is arranged to surround the opening 42. The ceramic dielectric 32 is fixed through the common electrode 38 on the upstand 44 of the ground fitment 40 using suitable means such as soldering or the like.

Further, the capacitor 30 includes a pair of through-conductors 46 each covered with an insulation tube 48 formed of a suitable material such as silicone. The insulation tubes 48 are inserted via the through-holes 34 and opening 42 and the through-conductors 46 each are fittedly secured in an electrode connector 50 fixed on each of the separate electrodes 36 by soldering or the like. Fixing of the conductor 46 with respect to the connector 50 may be carried out by soldering or the like.

The ground fitment 40 is formed of a metal plate by drawing so that the upstand 44 of a suitable height may be formed at an intermediate portion of the one surface of the fitment 40 so as to outwardly project from the fitment and surround the opening 42 and a recess 52 may be provided on the other surface of the ground fitment 40 to provide an inner surface of the upstand 44.

The capacitor 30 also includes an insulation case 54 securely fitted at a lower portion thereof on the upstand 44 of the ground fitment 40 so as to surround the ceramic dielectric 32 and an insulation cylinder 56 securely fitted at an upper portion thereof in the recess 52 of the ground fitment 40 so as to surround the through-conductors 46. The insulation case 54 and insulation cylinder 56 are filled with insulation resin materials 58 and 60 such as epoxy resin or the like to cover an outside and and inside of the ceramic dielectric 32 with the resins or embed it therein, to thereby ensure moisture-proofness and insulation properties of the ceramic dielectric 32.

The insulation case 54 and insulation cylinder 56 are formed of a thermoplastic resin material such as PBT or the like. Use of thermoplastic resin exhibits an advantage of absorbing stress due to heat shrinkage of the insulation resins 58 and 60 because it is relatively flexible and shrinkable.

The through-conductors 46 each are integrally formed at an end thereof received in the insulation case 54 with a fastening tab 62 in a manner such that it may be projected from an end of the insulation case 54 so as to facilitate connection of an external connector thereto.

Use of the conventional through-type capacitor constructed as described for a magnetron of an electronic range or the like causes the capacitor to be exposed to high humidity, oil fume, soot, dust and the like, because it is typically operated in a kitchen or the like. In the conventional capacitor, as noted from the foregoing, the fastening tabs 62 to which high voltage is applied and the ground fitment 40 are exposed to an ambient atmosphere, and likewise the insulation case 54 is exposed at an outer surface thereof to an ambient atmosphere. Such construction causes oil fume, soot, dust and the like to be adhered to an outer surface of the insulation case 54 due to electrostatic force produced by application of the high voltage. When moisture condensation occurs due to a variation in temperature of the ambient atmosphere in addition to such a phenomenon, the outer surface of the insulation case 54 is wetted to cause a surface resistance thereof to be highly decreased, resulting in creeping discharge occurring through a passage from the fastening tabs 62 via a surface 64 of the insulation resin 58 and the insulation case 54 to the ground fitment 40. This leads to carbonization of the surface of the insulation case 54 formed of thermoplastic resin to cause the creeping distance to be further shortened, resulting in burning of the insulation case 54.

In order to prevent such burning of the insulation case 54, flame retarder is conventionally added to thermoplastic resin for forming the insulation case 54. Unfortunately, addition of the flame retarder substantially deteriorates tracking resistance and arc resistance of the insulation case 54 to substantially fail to prevent damage of the case due to burning.

As another conventional means for preventing burning of the insulation case 54, it is proposed to form the insulation case 54 of a fire resistant thermosetting resin material or ceramic material. However, this causes the insulation resin or epoxy resin 58 filled in the insulation case 54 to be firmly adhered to an inner surface of the insulation case 54 during a step of curing the resin 58, so that tensile stress is generated in the insulation resin 58 in a direction toward the insulation case 54. This leads to peeling of the insulation resin 58 from an outer surface of the ceramic dielectric 32, resulting in deterioration of dielectric strength of the ceramic dielectric.

The conventional through-type capacitor is typically incorporated in a magnetron in such a manner as shown in FIGS. 4 and 5. A conventional magnetron generally indicated by reference numeral 66 in FIGS. 4 and 5 includes a filter box 68 and a cathode stem 70 having a cathode terminal and arranged in the filter box 68. The magnetron 66 also includes a pair of inductors 72, which are connected to the through-conductors 46 of the capacitor 30. The capacitor 30 is inserted through an opening 74 formed at a side wall 76 of the filter box 68 in a manner such that the insulation case 54 is outwardly projected from the filter box 68 and fixed at the ground fitment 40 to the filter box 68. The inductors 72 are connected in series between the cathode terminal of the cathode stem 70 and the through-conductors 46 of the capacitor 30. Reference numerals 78, 80, 82, 84 and 86 designate a magnet, a cooling fin, a mounting plate, a gasket and an RF output terminal, respectively.

When the conventional magnetron constructed as described above is used for an electronic range also called an electronic cooking stove, the through-type capacitor exhibits such disadvantages as described above to deteriorate satisfactory operation of the magnetron. Also, the construction causes water droplets 88 due to moisture condensation on surfaces of the cooling fin 80 and/or mounting plate 82 to drop on the surface of the insulation case 54 and then penetrate into the case. This leads to wetting of the insulation case 54 to substantially decrease surface resistance of the case to cause such creeping discharge as noted above, resulting in the same disadvantages as described above.

Such disadvantages noteworthily appear when the filter box 68 is formed into a small size to decrease a distance d between the cooling fin 80 and the insulation case 54, because a creeping distance between the fastening tabs 62 and the cooling fin 80 is reduced to a degree sufficient to further facilitate burning of the insulation case 54 due to creeping discharge.

Further, in the conventional through-type capacitor, as described above, each of the through-conductors 46, as shown in FIG. 6, has integrally attached thereto the fastening tab 62. More particularly, the through-conductor 46 is made by bending a section of a blanked metal plate other than a section thereof for the fastening tab 62 to form the through-conductor. The so-formed through-conductor 46 has an angular circle-like shape in section as shown in FIG. 7, thus, the prior art fails to form the through-conductor into a substantially circular shape. Accordingly, when the through-conductor 46 is protected with the insulation tube 48, the whole configuration of the through-conductor 46 and tube 48 is still angular as shown in FIG. 7. This causes stress generated during curing and contraction of the insulation resin 60 to be uniformly distributed as indicated by arrows in FIG. 7 to deteriorate thermal cycle resistance of the capacitor in repeated heating and cooling operation, resulting in a failure in dielectric strength of the capacitor.

Further, the through-conductor 46 is typically subjected to a surface treatment by plating of Sn or the like for the purpose of improving solderability and rust prevention. However, the angular shape of the conventional through-conductor shown in FIGS. 6 and 7 causes an acidic plating solution to remain in the bent portion of the conductor after plating to promote corrosion of the conductor and/or hinders contacting of the bent portion with a plating solution during plating to lead to a failure in plating of the bent portion.

Accordingly, it would be highly desirable to develop a through-type capacitor which is capable of effectively preventing peeling of an insulation resin from a ceramic dielectric and providing an insulation case of the capacitor with heat resistance, tracking resistance, arc resistance to improve burning resistance of the case, resulting in safely and positively operating for a long period of time, and a magnetron having incorporated such an advantageous capacitor incorporated therein.

SUMMARY OF THE INVENTION

Generally speaking, in accordance with the present invention, a through-type capacitor is provided which includes a ground fitment and a ceramic dielectric formed on both surfaces thereof with electrodes and fixed through one of the electrodes on the ground fitment. The ceramic dielectric is surrounded by an insulation case. The capacitor also includes through-conductors inserted through the ceramic dielectric and electrically connected to the other of the electrodes and insulation resin means filled in the insulation case so as to embed the ceramic dielectric therein. The insulation case comprises a first insulation case member formed of thermoplastic resin and arranged to surround the ceramic dielectric and a second insulation case member formed of thermosetting resin and integrally mounted on the first insulation member.

In accordance with another aspect of the present invention, there is provided a magnetron which includes a through-type capacitor constructed as described above. The magnetron also includes a filter box arranged to enclose a cathode stem having a cathode terminal therewith and including a side wall and inductors connected in series between the cathode terminal of the cathode stem and the through-conductors. The through-type capacitor is inserted through the side wall of the filter box in a manner to outwardly project an insulation case of the capacitor from the filter box and mounted through a ground fitment of the capacitor on the side wall of the filter box.

Accordingly, it is an object of the present invention to provide a through-type capacitor which is capable of satisfactorily operating without deterioration of its dielectric strength characteristics.

It is another object of the present invention to provide a through-type capacitor which is capable of effectively preventing peeling of an insulation resin from a ceramic dielectric.

It is another object of the present invention to provide a through-type capacitor which is capable of safely and positively operating for a long period of time.

It is a further object of the present invention to provide a through-type capacitor which is capable of providing an insulation case with heat resistance, tracking resistance and arc resistance to improve burning resistance of the case.

It is still another object of the present invention to provide a magnetron which is capable of satisfactorily operating without deterioration of dielectric strength characteristics of a through-type capacitor.

It is yet another object of the present invention to provide a magnetron which is capable of safely and positively operating for a long period of time.

It is still a further object of the present invention to provide a through-type capacitor which is capable of being improved in thermal cycle resistance, thereby to be positively used for a long period of time.

It is yet a further object of the present invention to provide a through-type capacitor which is capable of being subjected to uniform and effective plating, thereby to be positively used for a long period of time.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like or corresponding parts throughout; wherein.

FIG. 8 is an exploded perspective view showing an embodiment of a through-type capacitor according to the present invention;

FIG. 11 is a sectional front elevation view showing another embodiment of a through-type capacitor according to the present invention;

FIG. 12 is a sectional side elevation view of the through-type capacitor shown in FIG. 11;

FIG. 13 is an enlarged sectional view showing an essential part of the through-type capacitor of FIG. 11;

FIG. 20 is a graphical representation showing results of a dielectric strength test under moistening conditions carried out on each of a magnetron of the present invention and a conventional one.

DETAILED DESCRIPTION OF THE PREFERRED EMBODIMENTS

Now, the present invention will be described hereinafter with reference to the accompanying drawings.

Figure 10:
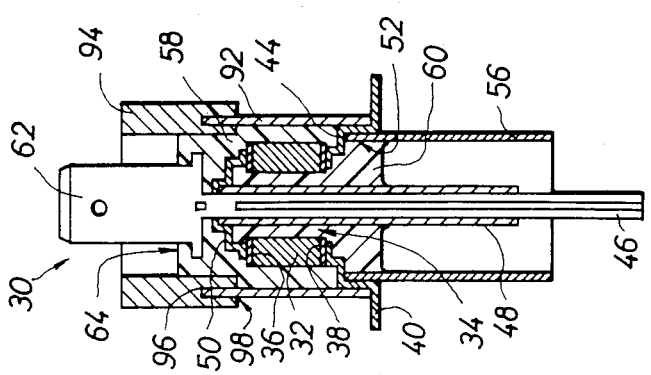
FIG. 10 is a sectional side elevation view of the through-type capacitor shown in FIG. 8.
Figure 9:
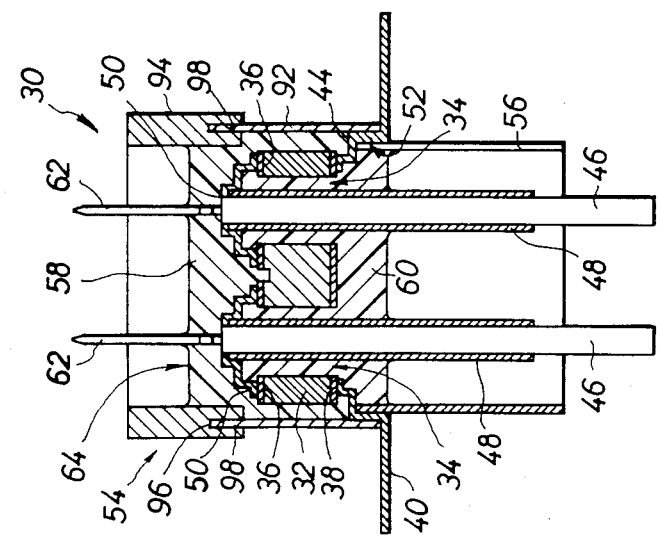
FIG. 9 is a sectional front elevation view of the through-type capacitor shown in FIG. 8.

FIGS. 8 to 10 show an embodiment of a through-type capacitor according to the present invention. A through-type capacitor of the illustrated embodiment indicated by reference numeral 30 in FIGS. 8 to 10 includes an insulation case 54 which comprises a first insulation case member 92 and a second insulation case member 94.

The first insulation case member 92 may be formed of thermoplastic insulation resin such as PBT into an elliptic cylindrical shape, resulting in having flexibility and contraction and expansion properties. The so-formed first insulation case member 92 is securely fitted at one end or a lower end thereof through one of electrodes 36 and 38 on an upstand 44 of a ground fitment 40 to surround a ceramic dielectric 32 and filled with an insulation resin material 58 to embed an outside of the ceramic dielectric 32 in the resin 58. Such formation and arrangement of the first insulation case member 92 causes it to absorb stress due to heat shrinkage of the insulation resin 58 during curing of the resin and/or a thermal cycle test because of its flexibility and contraction and expansion properties, so that peeling of the insulation resin 58 from the ceramic dielectric 32 may be effectively prevented.

The second insulation case member 94 may be formed of thermosetting insulation resin into an elliptic cylindrical shape and is integrally arranged on one end or an upper end 96 of the first insulation case member 92 in a superposed manner. Such arrangement of the second insulation case member 94 causes the insulation case 54 to exhibit satisfactory heat resistance, tracking resistance, arc resistance and fire resistance due to properties of thermosetting insulation resin. This effectively prevents burning of the insulation case 54 even when oil fume, soot, dust and the like are adhered to an outer surface of the second insulation case member 94.

Mounting of the second insulation case member 94 on the first insulation case member 92 may be conveniently carried out using engagement means. More particularly, in the illustrated embodiment, the engagement means comprises an annular groove 98 formed on one end surface or a lower end surface of the second insulation case member 94. Then, in the annular groove 98 is fitted the upper end 96 of the first insulation case member 92 in the annular groove 98. Such construction facilitates secure joining of the first and second insulation case members 92 and 94 and integration therebetween. Also, the second insulation case member 94 is preferably embedded at at least a part of one end or a lower end thereof in the insulation resin 58 filled in the first insulation case member 92, as shown in FIGS. 9 and 10. This lead to securer joining of the second insulation case member 94 to the first one 92 to prevent separation of the former from the latter.

Figure 1:
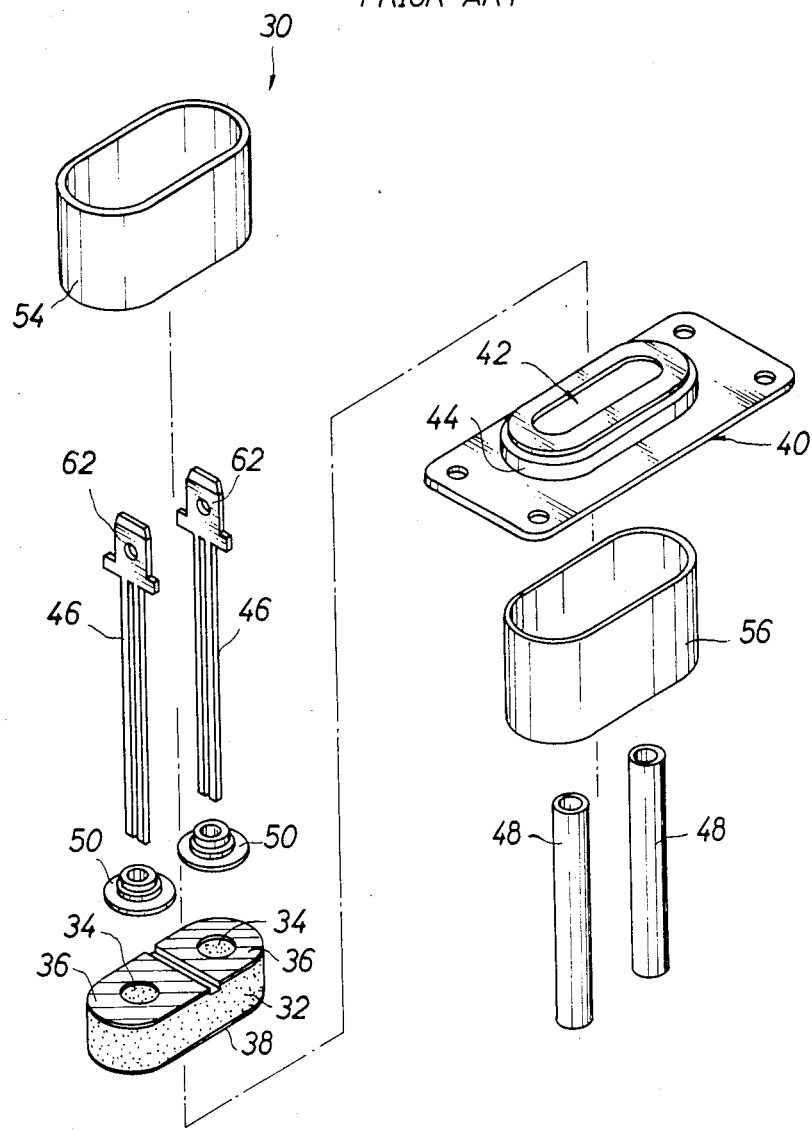
FIG. 1 is an exploded perspective view showing a conventional through-type capacitor.
Figure 3:
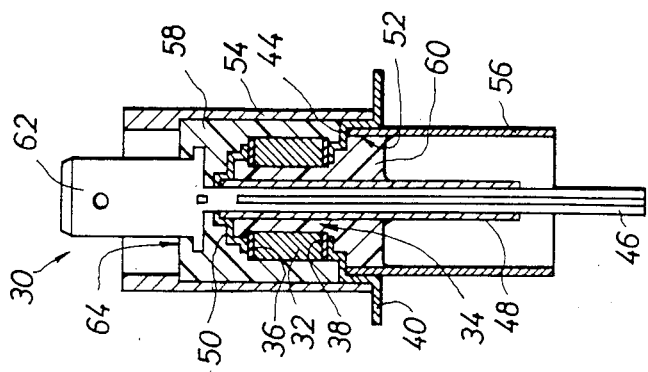
FIG. 3 is a sectional side elevation view of the through-type capacitor shown in FIG. 1.
Figure 2:
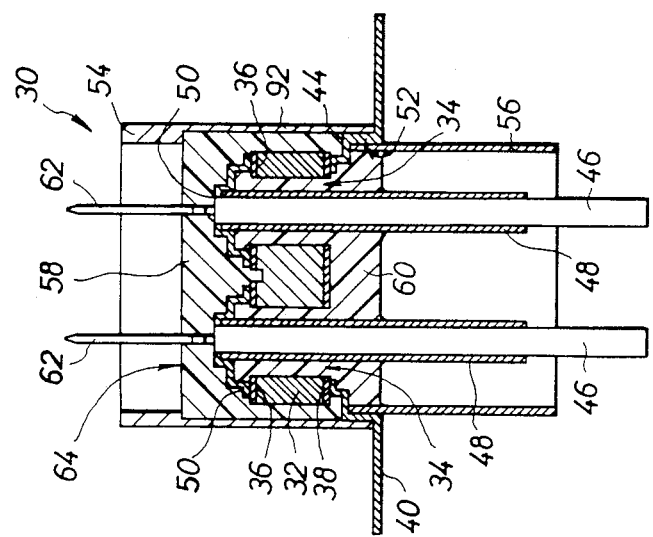
FIG. 2 is a sectional front elevation view of the through-type capacitor shown in FIG. 1.

The remaining of the embodiment of FIGS. 8 to 10 may be constructed in substantially the same manner as the conventional through-type capacitor described above with reference to FIGS. 1 to 3.

As described above, the illustrated embodiment is so constructed that the first insulation case member 92 formed of a thermoplastic insulation resin material is arranged to enclose the ceramic dielectric 32 and filled with the insulation resin 58 to embed the ceramic dielectric 32 therein. Accordingly, the embodiment exhibits an advantage of absorbing stress due to heat shrinkage of the insulation resin 58 by flexibility and contraction and expansion properties of the first insulation case member 92 to effectively prevent peeling of the insulation resin 58 from the ceramic dielectric 32 during curing of the insulation resin and a heat cycle test, resulting in an improvement of dielectric strength of the capacitor. Also, the illustrated embodiment is constructed in the manner that the second insulation case member 94 formed of a thermosetting resin material is integrally mounted on the first insulation case member. Accordingly, the embodiment has another advantage of providing the capacitor with heat resistance, tracking resistance, arc resistance and fire resistance sufficient to improve burning resistance of the capacitor. This substantially prevents burning of the capacitor, to thereby ensure safe and positive operation of the capacitor for a long period of time.

FIGS. 11 to 13 show another embodiment of a through-type capacitor according to the present invention. A capacitor of the illustrated embodiment is constructed in a manner such that first and second insulation case members 92 and 94 are formed and joined together to cause outer surfaces of both case members joined to be substantially flush with each other. Such formation and joining of both case members may be carried out in such a manner as shown in FIG. 13. The outer surface of the second insulation case member 94 is circumferentially reduced in diameter at a lower end portion thereof and the first insulation case member 92 is fitted at an upper end portion thereof on the so-formed reduced lower end portion of the second insulation case member 94. In FIG. 13, securer joining of both case members may be carried out using engagement means. More particularly, the engagement means comprises a projection provided on an inner surface of the upper end portion of the first insulation case member 92 and a recess 102 formed on an outer surface of the reduced lower end portion of the second insulation case member 94. In joining of both case members, the projection 100 is fitted in the recess, resulting in the joining being more firmly accomplished. The projection 100 and recess 102 each may be formed so as to extend in a circumferential direction of the corresponding case member. The remaining of the embodiment may be constructed in substantially the same manner as that shown in FIGS. 8 to 10.

Thus, it will be noted that the illustrated embodiment exhibits, in addition to the advantages of the capacitor shown in FIGS. 8 to 10, an advantage of rendering adhesion of water droplets, dust and the like to an outer surface of the an insulation case 54 more difficult to further improve burning resistance of the capacitor, because the first and second case members 92 and 94 are arranged to be substantially flush with each other. Also, the embodiment exhibits another advantage of more firmly joining the first and second case members 92 and 94 together, since it is carried out by fitted engagement between the projection 100 and the recess 102, so that separation of the second insulation case member 94 from the first one 92 may be effectively prevented even when the insulation case 54 is invertedly placed prior to charging of the insulation resin 58.

Figure 14:
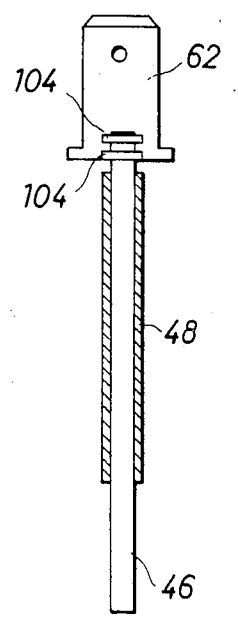
FIG. 14 is a front elevation view in partly in section showing a through-conductor.
Figure 15:
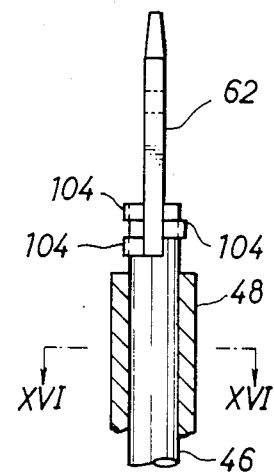
FIG. 15 is an enlarged side elevation view partly in section showing an essential part of the through-conductor shown in FIG. 14.
Figure 16:
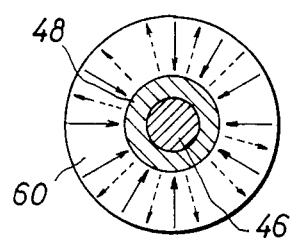
FIG. 16 is a sectional view taken along line XVI—XVI of FIG. 15.

In each of the embodiments described above, through-conductors 46 each may be constructed as shown in FIGS. 14 to 16. More particularly, the through-conductors 46 each are formed into a substantially circular shape in section. Such a shape of the through-conductor 46, when the conductor is protected with an insulation tube 48 formed of silicone or the like, causes the whole configuration of the conductor 46 and insulation tube 90 to be kept substantially circle, so that stress occurring during curing and shrinkage of an insulation resin 60 may be rendered uniform as shown in FIG. 16. This results in the capacitor being improved in thermal cycle resistance and a failure in dielectric strength being prevented. Also, this accomplishes uniform plating on the through-conductor 46 and provides it with satisfactory solderability.

For this purpose, the through-conductor 46 may be formed of a rod material and a fastening tab 62 connected to the conductor 46 may be formed of a sheet material. The fastening tab 62 is provided at a lower end thereof with at least one expansion 104, in which an end of the through-conductor is inserted, and then caulking is carried out to integrally connect the expansion 104 and conductor 46 together. Thereafter, the through-conductor 46 is subjected to plating.

Figure 17:
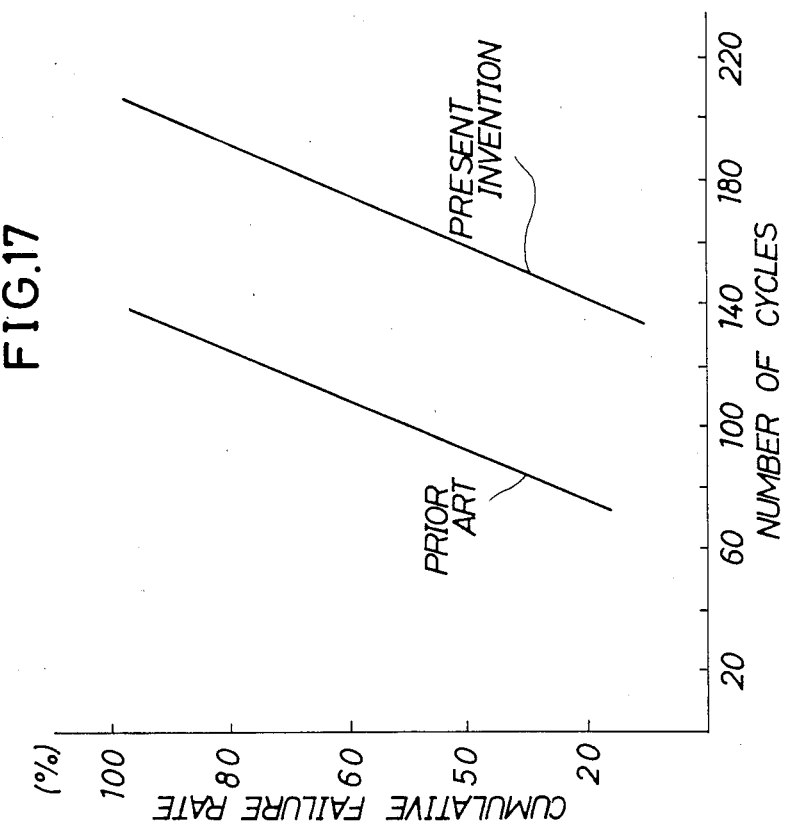
FIG. 17 is a graphical representation showing results of a comparative test of thermal cycle resistance carried out on each of a through-type capacitor of the present invention and a conventional one.

A comparative test of thermal cycle resistance characteristics was carried out using the through-type capacitor of the present invention in which the so-constructed through-conductors 46 are incorporated and the conventional capacitor. The results were as shown in FIG. 17, which indicates that the capacitor of the present invention is highly superior in thermal cycle resistance to the conventional one.

Thus, it will be noted that construction of the through-conductor shown in FIGS. 14 to 16 causes thermal cycle resistance of the conductor to be significantly improved to prevent a failure in dielectric strength of the capacitor and facilitates uniform and effective plating on the through-conductor 46, so that the capacitor may be positively operated for a long period of time.

Figure 18:
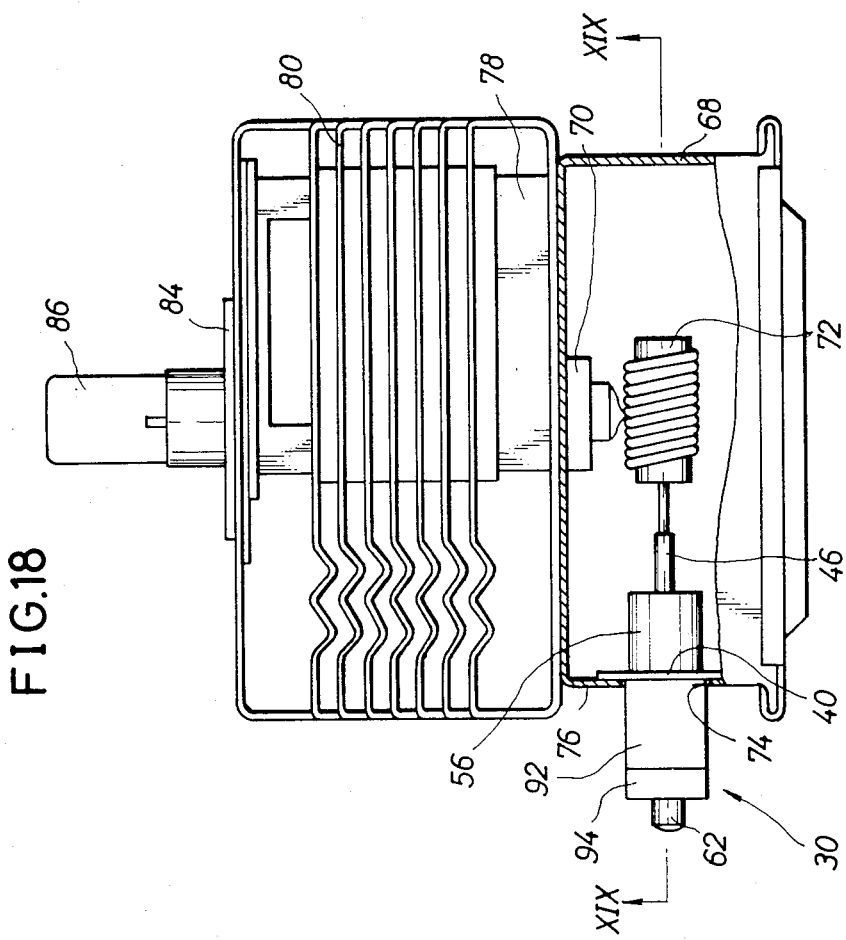
FIG. 18 is a front elevation view partly in section showing a magnetron according to the present invention.
Figure 19:
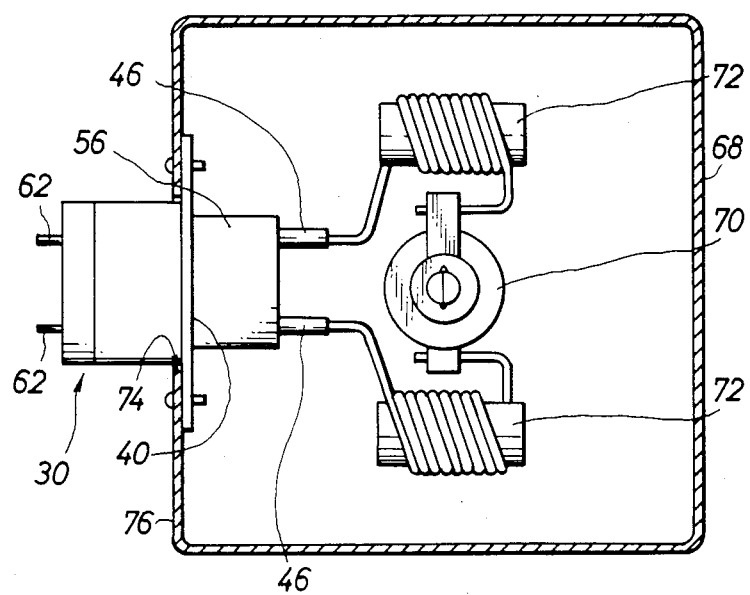
FIG. 19 is a sectional view taken along line XIX—XIX of FIG. 18.

FIGS. 18 and 19 show a magnetron suitable for use for an electronic range or the like in which the through-type capacitor shown in FIGS. 8 to 10 or FIGS. 11 to 13 is incorporated. A magnetron of the embodiment generally designated by reference numeral 66 may be constructed in substantially the same manner as the conventional one shown in FIGS. 4 and 5 except for the through-type capacitor 30.

Figure 4:
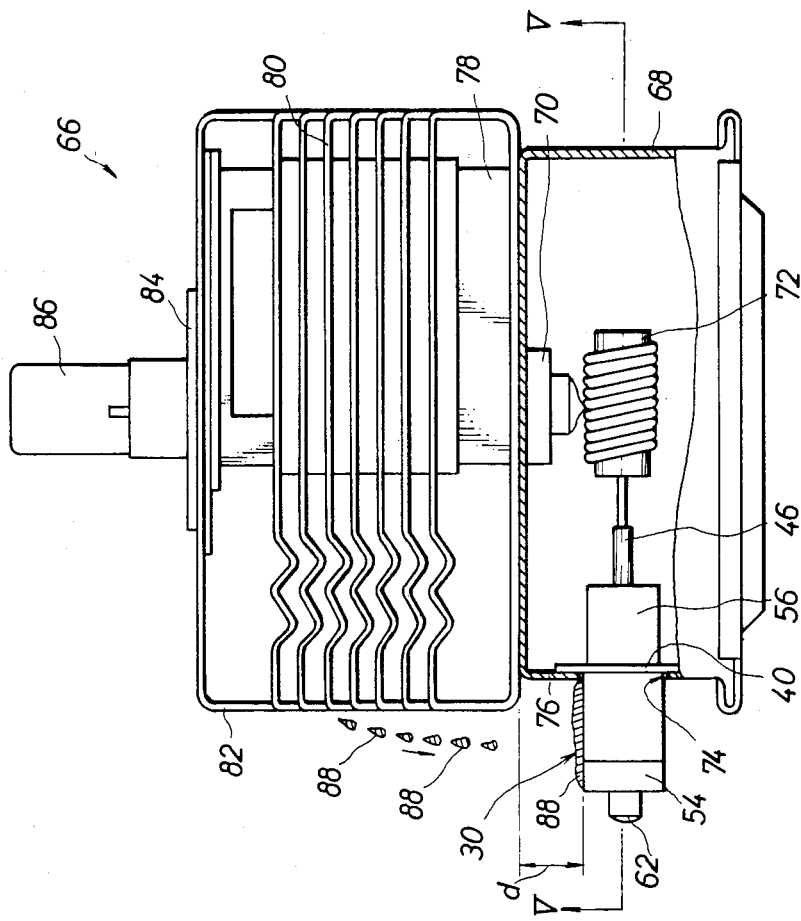
FIG. 4 is a front elevation view partly in section showing a conventional magnetron.
Figure 5:
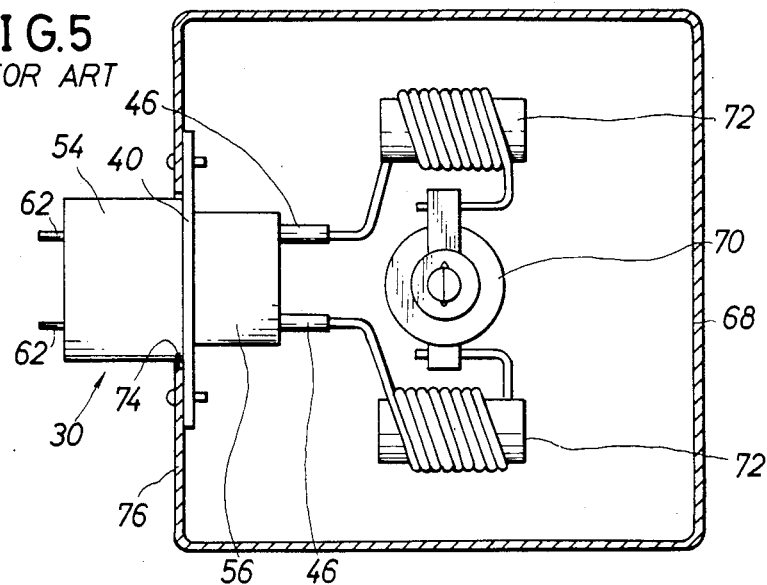
FIG. 5 is a sectional view taken along line V—V of FIG. 4.
Figure 6:
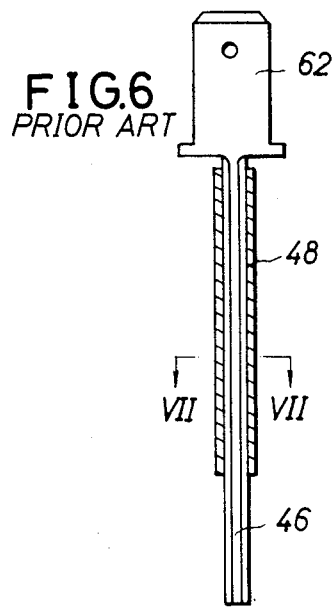
FIG. 6 is a front elevation view partly in section showing a through-conductor used in the conventional through-type capacitor shown in FIG. 1.
Figure 7:
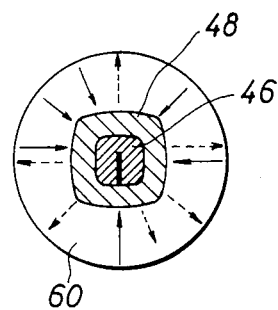
FIG. 7 is a sectional view taken along line VII—VII of FIG. 6.

FIG. 20 shows results of a dielectric strength test under moistening conditions which took place with respect to each of the so-constructed magnetron of the present invention shown in FIGS. 18 and 19 and the conventional magnetron shown in FIGS. 4 and 5. The test was carried out by subjecting each of the magnetrons to continuous moistening by means of an ultrasonic humidifier and intermittently applying voltage thereto by an on-off control action.

FIG. 20 indicates that the conventional magnetron has a cumulative failure rate exceeding 90% after a lapse of 350 hours, whereas that of the magnetron of the present invention after 350 hours is zero and is kept as low as 10% or less even after 700 hours. Thus, it will be noted that the magnetron of the present invention is highly improved in humidity resistance and dielectric strength.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A through-type capacitor comprising:
a ground fitment;

a ceramic dielectric formed on both surfaces thereof with electrodes and fixed through one of said electrodes on said ground fitment;

an insulation case arranged to surround said ceramic dielectric;

through-conductors inserted through said ceramic dielectric and electrically connected to the other of said electrodes; and insulation resin means filled in said insulation case so as to embed said ceramic dielectric therein;

said insulation case comprising a first insulation case member formed of thermoplastic resin having flexibility and contraction and expansion properties and arranged to surround said ceramic dielectric, and a second insulation case member formed of thermosetting resin having heat resistance, tracking resistance, arc resistance and fire resistance and integrally mounted on said first insulation case member.

2. A through-type capacitor as defined in claim 1, wherein said second insulation case member is formed with engagement means through which said second insulation case member is mounted on said first insulation case member.

3. A through-type capacitor as defined in claim 2, wherein said engagement means comprises an annular groove formed on a lower end surface of said second insulation case member, mounting of said second insulation case member on said first insulation case member being carried out by fitting an upper end of said first insulation case member in said annular groove of said second insulation case member.

4. A through-type capacitor as defined in claim 3, wherein said second insulation case member is embedded at least a part of a lower end portion thereof in said insulation resin means filled in said first insulation case member.

5. A through-type capacitor as defined in claim 1, wherein said first and second insulation case members are arranged so as to be substantially flush at an outer surface thereof with each other.

6. A through-type capacitor as defined in claim 5, further comprising engagement means for securely mounting said second insulation case member on said first insulation case member.

7. A through-type capacitor as defined in claim 6, wherein said outer surface of said second insulation case member is circumferentially reduced in diameter at a lower end portion thereof and said first insulation case member is fitted at an upper end portion thereof on said reduced lower end portion of said second insulation case member.

8. A through-type capacitor as defined in claim 7, wherein said engagement means comprises a groove formed on an outer surface of said reduced lower end portion of said second insulation case member and a projection formed on an inner surface of said upper end portion of said first insulation case member and fitted in said groove.

9. A through-type capacitor as defined in claim 8, wherein said groove and projection are circumferentially formed.

10. A through-type capacitor as defined in claim 1, wherein said through-conductors each comprising a rod material.

11. A through-type capacitor as defined in claim 10 said through-conductors each are integrally connected to a fastening tab by caulking.

12. A through-type capacitor comprising:
a ground fitment;
a ceramic dielectric formed on both surfaces thereof with electrodes and fixed through one of said electrodes on said ground fitment;
an insulation case arranged to surround said ceramic dielectric;
through-conductors inserted through said ceramic dielectric and electrically connected to the other of said electrodes; and
insulation resin means filled in said insulation case so as to embed said ceramic dielectric therein;
said insulation case comprising a first insulation case member formed of thermoplastic resin having flexibility and contraction and expansion properties and arranged to surround said ceramic dielectric, and a second insulation case member formed of thermosetting resin having heat resistance, tracking resistance, arc resistance and fire resistance and integrally mounted on said first insulation case member;
said through-conductors each comprising a rod material and being integrally connected to said fastening tab by caulking.

13. A magnetron comprising:
a filter box arranged to enclose a cathode stem having a cathode terminal therewith and including a side wall;
a through-type capacitor comprising a ground fitment, a ceramic dielectric formed on both surfaces thereof with electrodes and fixed through one of said electrodes on said ground fitment, an insulation case arranged to surround said ceramic dielectric, through-conductors inserted through said ceramic dielectric and electrically connected to the other of said electrodes, and insulation resin means filled in said insulation case so as to embed said ceramic dielectric therein, said insulation case comprising a first insulation case member formed of thermoplastic resin having flexibility and contraction and expansion properties and arranged to surround said ceramic dielectric, and a second insulation case member formed of thermosetting resin having heat resistance, tracking resistance, arc resistance and fire resistance and integrally mounted on said first insulation case member;
said through-type capacitor being inserted through said side wall of said filter box in a manner to outwardly project said insulation case from said filter box and mounted through said ground fitment on said side wall of said filter box; and
inductors connected in series between said cathode terminal of said cathode stem and said through-conductors.

14. A magnetron as defined in claim 13, wherein said second insulation case member is formed with engagement means through which said second second insulation case member is mounted on said first insulation case member.

15. A magnetron as defined in claim 14, wherein said engagement means comprises an annular groove formed on a lower end surface of said second insulation case member, mounting of said second insulation case member on said first insulation case member being carried out by fitting an upper end of said first insulation case member in said annular groove of said second insulation case member.

16. A magnetron as defined in claim 15, wherein said second insulation case member is embedded at at least a part of a lower end portion thereof in said insulation resin means filled in said first insulation case member.

17. A magnetron as defined in claim 13, wherein said first and second insulation case members are arranged so as to be substantially flush at an outer surface thereof with each other.

18. A magnetron as defined in claim 17, further comprising engagement means for securely mounting said second insulation case member on said first insulation case member.

19. A magnetron as defined in claim 18, wherein said outer surface of said second insulation case member is circumferentially reduced in diameter at a lower end portion thereof and said first insulation case member are fitted at an upper end portion thereof on said reduced lower end portion of said second insulation case member.

20. A magnetron as defined in claim 19, wherein said engagement means comprises a groove formed on an outer surface of said reduced lower end portion of said second insulation case member and a projection formed on an inner surface of said upper end portion of said first insulation case member and fitted in said groove.

21. A magnetron as defined in claim 20, wherein said groove and projection are circumferentially formed.

22. A magnetron as defined in claim 13, wherein said through-conductors each comprising a rod material.

23. A magnetron as defined in claim 22, said through-conductors each are integrally connected to a fastening tab by caulking.

* * * * *